(12) United States Patent
Boyer

(10) Patent No.: US 12,459,298 B2
(45) Date of Patent: Nov. 4, 2025

(54) AIRLESS TIRE

(71) Applicant: Mindmatter Wheel Works, Inc., Montreal (CA)

(72) Inventor: Geoffrey Boyer, Dorval (CA)

(73) Assignee: Mindmatter Wheel Works, Inc., Montreal (CA)

( * ) Notice: Subject to any disclaimer, the term of this patent is extended or adjusted under 35 U.S.C. 154(b) by 684 days.

(21) Appl. No.: 17/862,063

(22) Filed: Jul. 11, 2022

(65) Prior Publication Data

US 2023/0013412 A1    Jan. 19, 2023

Related U.S. Application Data

(60) Provisional application No. 63/220,711, filed on Jul. 12, 2021.

(51) Int. Cl.
*B60C 7/20* (2006.01)
*B60C 7/18* (2006.01)
*B60C 7/00* (2006.01)

(52) U.S. Cl.
CPC .............. *B60C 7/20* (2013.01); *B60C 7/18* (2013.01); *B60C 2007/005* (2013.01)

(58) Field of Classification Search
CPC .......... B60C 7/14; B60C 7/143; B60C 7/146; B60C 7/18; B60C 7/20; B60C 2007/005
See application file for complete search history.

(56) References Cited

U.S. PATENT DOCUMENTS

| | | | | |
|---|---|---|---|---|
| 3,018,809 A * | 1/1962 | Bernard | ................... | B60C 7/24 |
| | | | | 152/301 |
| 4,350,196 A * | 9/1982 | Hampshire | ............... | B60B 5/02 |
| | | | | 152/5 |
| 4,558,727 A * | 12/1985 | Golata | ..................... | B60C 7/00 |
| | | | | 152/5 |
| 5,353,853 A * | 10/1994 | Hansson | ................... | B60B 9/00 |
| | | | | 152/5 |
| 11,235,619 B2 * | 2/2022 | Tsuji | ......................... | B60C 7/10 |
| 2004/0140708 A1 * | 7/2004 | Bott | ........................ | A47L 9/009 |
| | | | | 301/5.301 |
| 2009/0173421 A1 * | 7/2009 | Love | ........................ | B60C 7/18 |
| | | | | 152/11 |
| 2017/0239980 A1 * | 8/2017 | Catalano | .................... | B60C 7/26 |
| 2019/0061428 A1 * | 2/2019 | Iwamura | ................. | B60C 7/143 |
| 2019/0184748 A1 * | 6/2019 | Tsuji | ......................... | B60C 7/10 |
| 2021/0178827 A1 * | 6/2021 | Tahara | ................... | B60C 11/047 |

FOREIGN PATENT DOCUMENTS

WO    WO-2021153161 A1 *   8/2021

* cited by examiner

*Primary Examiner* — Kip T Kotter
(74) *Attorney, Agent, or Firm* — Carlson, Gaskey & Olds, P.C.

(57) ABSTRACT

A one-piece tire has an elastomer material composition that is homogeneous and consistent throughout the entire tire. An annular outer portion of the one-piece tire includes an outwardly facing surface that defines an outer circumference of the tire and a width of the tire between a first edge on a first lateral side and second edge on a second lateral side of the tire. An annular inner portion defines an inner circumference of the tire. The annular inner portion has a first edge on the first lateral side of the tire and a second edge on the second lateral side of the tire. An annular resilient spring portion extends from a first junction near the first edge of the annular inner portion to a second junction near the second edge of the annular outer portion.

22 Claims, 7 Drawing Sheets

AIRLESS TIRE

CROSS-REFERENCE TO RELATED APPLICATION

This application claims priority to US Provisional Application No. 63/220,711, filed on Jul. 12, 2021.

BACKGROUND

Tires have proven useful on a variety of vehicles, machines, and devices. Many tires are pneumatic or filled with air to provide a continuous and uninterrupted spring rate around the circumference of the tire. Airless or non-pneumatic tires have been developed. A significant drawback with many airless tires is an inconsistent spring rate around the circumference when the tire is under load. A discontinuous or interrupted spring rate results in a tire that does not roll smoothly and, instead, feels or appears segmented. Other shortcomings of known airless tires include an undesirably high cost to manufacture them, a tendency to collect dirt or debris in open spaces along the sides of the tire, and noise while rotating.

SUMMARY

An illustrative example embodiment of a tire includes a one-piece body having an elastomer material composition. The one-piece body includes an annular outer portion, an annular inner portion, and an annular resilient spring portion. The annular outer portion includes an outwardly facing surface that defines an outer circumference of the tire. The annular outer portion defines a width of the tire between a first edge on a first lateral side of the tire and second edge on a second lateral side of the tire. The annular inner portion defines an inner circumference of the tire. The annular inner portion has a first edge on the first lateral side of the tire and a second edge on the second lateral side of the tire. The annular resilient spring portion extends between a first junction near the first edge of the annular inner portion and a second junction near the second edge of the annular outer portion. The elastomer material composition of the annular outer portion, the annular inner portion, and the annular resilient spring portion is homogeneous and consistent throughout an entirety of the one-piece body.

In addition to one or more of the features described above, or as an alternative, an entirety of the one-piece body is formed during a single manufacturing process that establishes the annular outer portion, the annular inner portion, and the annular resilient spring portion.

In addition to one or more of the features described above, or as an alternative, the single manufacturing process comprises injection molding, compression molding, casting or three-dimensional printing.

In addition to one or more of the features described above, or as an alternative, the elastomer material comprises rubber.

In addition to one or more of the features described above, or as an alternative, the first junction and the second junction each include a rounded bend.

In addition to one or more of the features described above, or as an alternative, the annular resilient spring portion has a curved profile between the first junction and the second junction.

In addition to one or more of the features described above, or as an alternative, the outwardly facing surface of the annular outer portion defines a ground-engaging tread of the tire.

In addition to one or more of the features described above, or as an alternative, the annular resilient spring portion has a default position in which the annular resilient spring portion is spaced from an inwardly facing surface of the annular outer portion, and at least a section of the annular resilient spring portion flexes under load into a compressed position where the section of the annular resilient spring portion contacts the inwardly facing surface on the annular outer portion.

In addition to one or more of the features described above, or as an alternative, the section of the annular resilient spring portion engages the inwardly facing surface on the annular outer portion in a manner that resists relative lateral movement between the annular resilient spring portion and the annular outer portion.

In addition to one or more of the features described above, or as an alternative, the first junction flexes a first amount in response to the load, the second junction flexes a second amount in response to the load, and the second amount is greater than the first amount.

In addition to one or more of the features described above, or as an alternative, the tire includes a stiffening reinforcement between the annular resilient spring portion and the annular inner portion.

In addition to one or more of the features described above, or as an alternative, the stiffening reinforcement comprises a plurality of ribs.

In addition to one or more of the features described above, or as an alternative, the annular resilient spring portion has a single, consistent thickness between the first junction and the second junction, or a varying thickness between the first junction and the second junction.

In addition to one or more of the features described above, or as an alternative, the annular resilient spring portion flexes from a default position into a compressed position in response to a force in a direction perpendicular to an axis of rotation of the tire, and the annular resilient spring portion deflects at least some of the force in a direction toward one of the lateral sides of the tire.

In addition to one or more of the features described above, or as an alternative, the annular outer portion moves relative to the annular inner portion in a lateral direction in response to the at least some of the force that is deflected.

In addition to one or more of the features described above, or as an alternative, the annular resilient spring portion is configured to establish lines of thrust directed toward the second lateral side.

In addition to one or more of the features described above, or as an alternative, the annular resilient spring portion has a first thickness between the first junction and a midsection of the annular resilient spring portion, the midsection of the annular resilient spring portion has a second thickness, the first thickness is greater than the second thickness, the annular resilient spring portion has a third thickness between the midsection and the second junction, and the third thickness is greater than the second thickness.

In addition to one or more of the features described above, or as an alternative, the first thickness progressively increases along a direction from the midsection toward the first junction, and the second thickness progressively increases along a direction from the midsection toward the second junction.

In addition to one or more of the features described above, or as an alternative, the annular inner portion is configured to be secured to a wheel hub.

An illustrative example embodiment of a method of making a tire includes using a single manufacturing process to establish a one-piece body having an elastomer material composition that is homogeneous and consistent throughout an entirety of the one-piece body. The one-piece body has an annular outer portion, an annular inner portion, and an annular resilient spring portion. The annular outer portion includes an outwardly facing surface that defines an outer circumference of the tire. The annular outer portion has a first edge on a first lateral side of the tire and second edge on a second lateral side of the tire. The annular inner portion defines an inner circumference of the tire. The annular inner portion has a first edge on the first lateral side of the tire and a second edge on the second lateral side of the tire. The annular resilient spring portion extends between a first junction near the first edge of the annular inner portion and a second junction near the second edge of the annular outer portion.

The various features and advantages of at least one disclosed example embodiment will become apparent to those skilled in the art from the following detailed description. The drawings that accompany the detailed description can be briefly described as follows.

DETAILED DESCRIPTION

Figure 1:
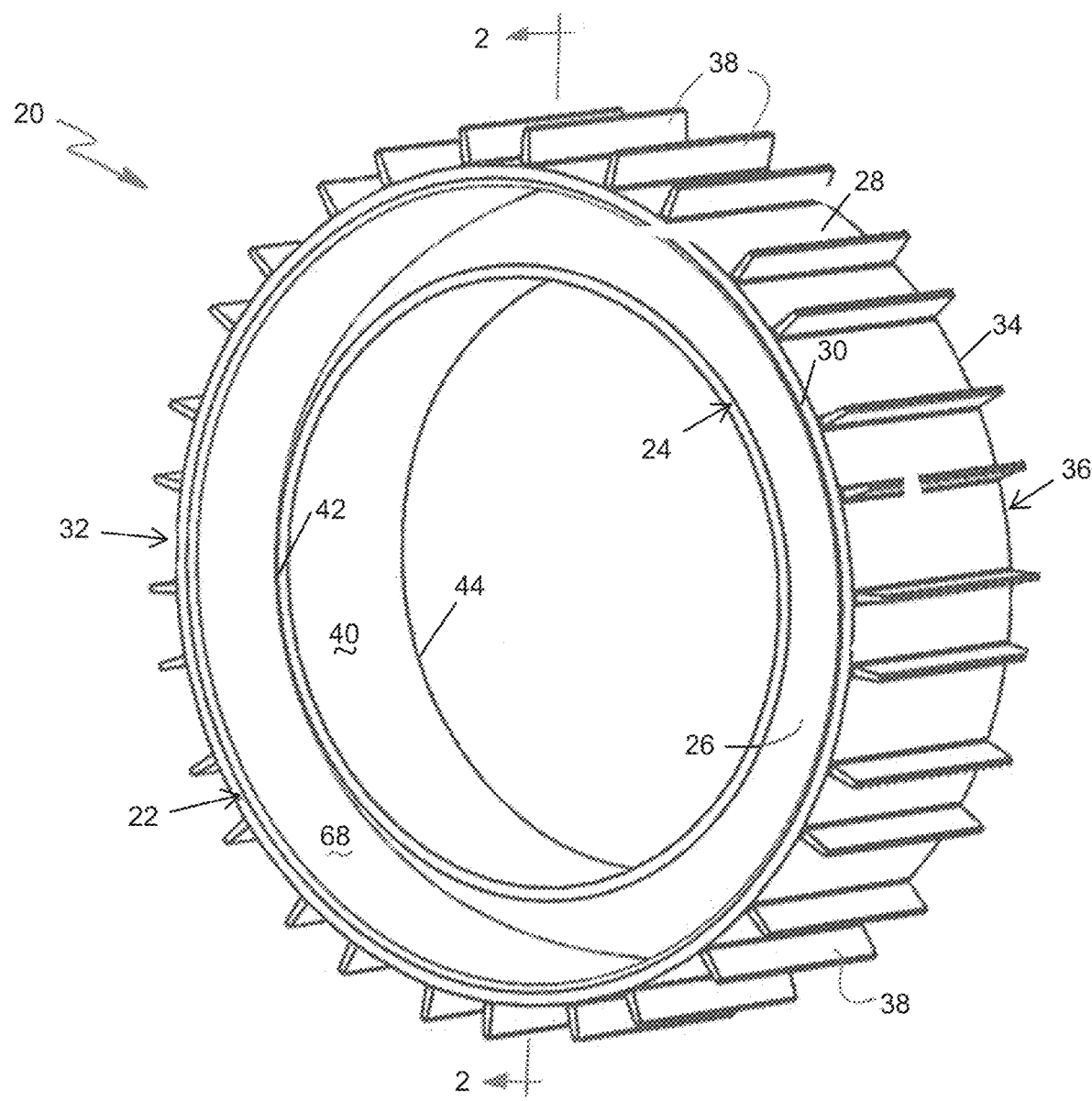
FIG. 1 is a perspective view of an illustrative example tire designed according to an embodiment of this invention.
Figure 2:
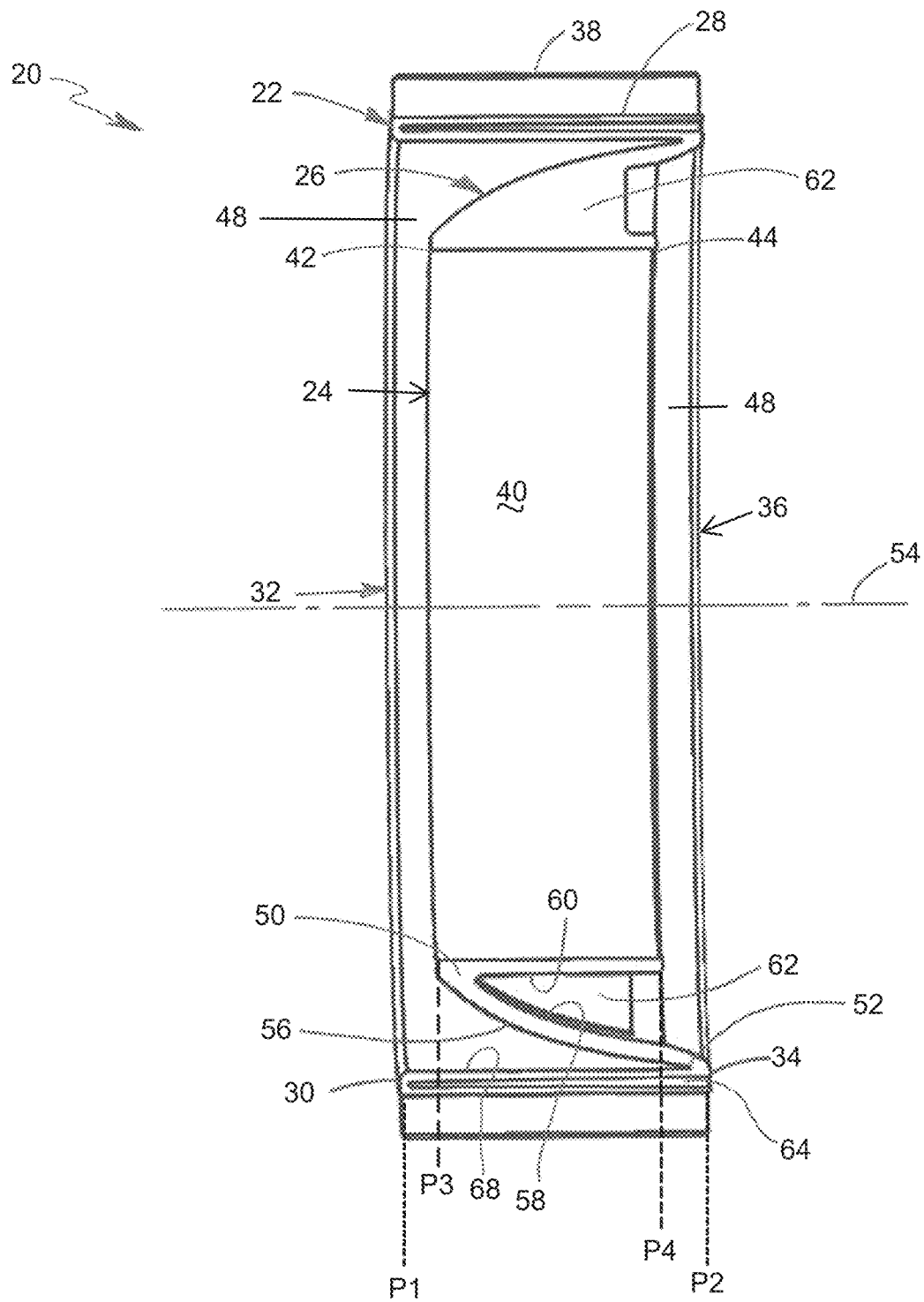
FIG. 2 is a cross-sectional view taken along the lines 2-2 in FIG. 1.
Figure 3:
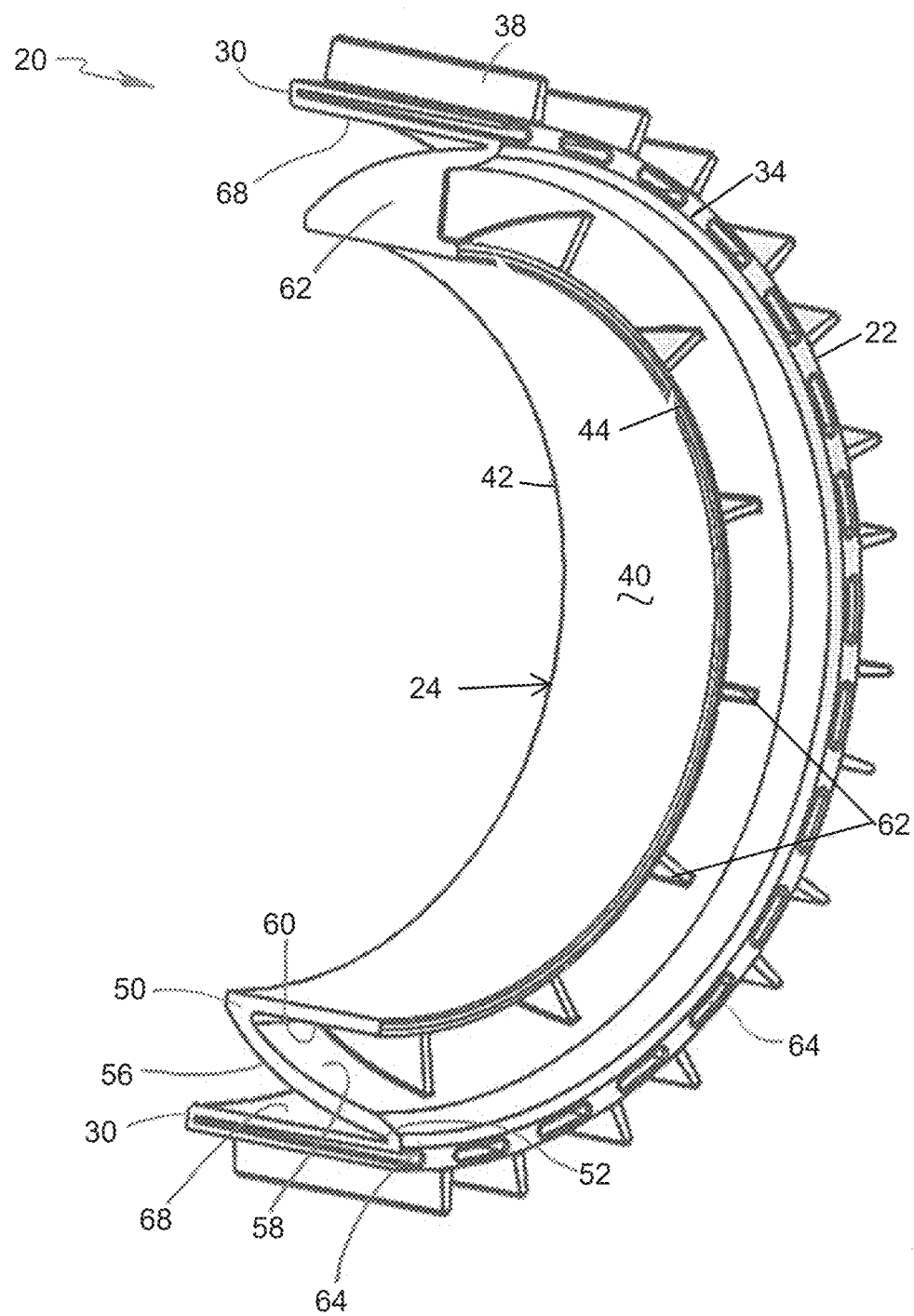
FIG. 3 is a sectional, perspective view of the example tire shown in FIG. 1 showing features not visible in FIG. 1.

FIGS. 1-3 show an example embodiment of a tire 20 including an annular outer portion 22, an annular inner portion 24, and an annular resilient spring portion 26. The annular outer portion includes an outwardly facing surface 28 that defines an outer circumference of the tire 20. The annular outer portion defines a width of the tire between a first edge 30 on a first lateral side 32 of the tire 20 and second edge 34 on a second lateral side 36 of the tire 20.

In this example, the outwardly facing surface 28 defines a tread of the tire 20, which includes radially extending projections 38. The tread of the tire 20 in this example extends across the entire width of the outwardly facing surface 28 between the first edge 30 and the second edge 34. Other tread designs are included on other embodiments. For example, the tread of the tire 20 may be smooth or include a pattern of grooves and may not extend across the entire width of the outwardly facing surface 28.

The annular inner portion 24 includes an inwardly facing surface 40 that defines an inner circumference of the tire 20. The annular inner portion 24 has a first edge 42 on the first lateral side 32 of the tire 20 and a second edge 44 on the second lateral side 36 of the tire 20.

The annular resilient spring portion 26 extends from a first junction 50 near the first edge 42 of the annular inner portion 24 to a second junction 52 near the second edge 34 of the annular outer portion 22. Each of the junctions 50 and 52 includes a rounded bend. In this example embodiment, the annular resilient spring portion 26 is frustoconical (i.e., resembles the base or frustum of a cone), has an arcuate or curved profile, and extends at an oblique angle relative to an axis of rotation 54 of the tire 20. The annular resilient spring portion 26 between the annular inner portion 24 and the annular outer portion 26 establishes an asymmetric and cantilevered tire construction. As shown in FIG. 2 (in which the tire 20 is uncompressed), both the first edge 42 and the second edge 44 are disposed within a cavity 48 formed by the annular outer portion 26. Also, as shown in FIG. 2, the first edge 42 of the annular inner portion 24 (axial position P3) is closer to an axial position P1 of the first edge 30 of the annular outer portion 22 than to an axial position P2 of the second edge 34 of the annular outer portion 22, with the axial positions being with respect to the axis of rotation 54. Also, as shown in FIG. 2, as the annular resilient spring portion 26 extends towards the second edge 34 of the annular outer portion 22, the annular resilient spring portion extends beyond an axial position P4 of the second edge 44 of the annular inner portion 24.

The illustrated annular resilient spring portion 26 has an outwardly facing surface 56 and an inwardly facing surface 58. The annular inner portion 24 has an outwardly facing surface 60 oriented toward the inwardly facing surface 58. As best appreciated from FIG. 3, a stiffening reinforcement 62 between the annular resilient spring portion 26 and the annular inner portion 24 adds stiffness to the annular resilient spring portion 26. In this embodiment, the stiffening reinforcement 62 comprises a plurality of ribs that are circumferentially spaced around the tire 20. In other embodiments, the stiffening reinforcement occupies the entire periphery of the annular resilient spring portion 26. For example, some or all of the space between the surfaces 58 and 60 may be occupied by resilient material.

As also best appreciated from FIG. 3, the annular outer portion 22 includes a plurality of cavities or voids 64 spaced evenly around the circumference of the annular outer portion 22. The cavities or voids 64 reduce the mass of the tire 20, which may provide an advantage in at least some situations where weight or material cost are a concern.

The annular outer portion 22 is cantilevered from the second junction 52, which allows for more relative movement between the annular outer portion 22 and the annular resilient spring portion 26 than any relative movement between the annular inner portion 24 and the annular resilient spring portion 26 in response to a load or force that is perpendicular to the axis of rotation 54. A vertical load or force on the tire 20 causes the second junction 52 to deflect or deform more than the first junction 50. The cantilevered configuration of the annular outer portion 22 and the stiffening reinforcement 62 contribute to the difference in deflection of the first junction 50 and the second junction 52 in this embodiment.

Figure 4:
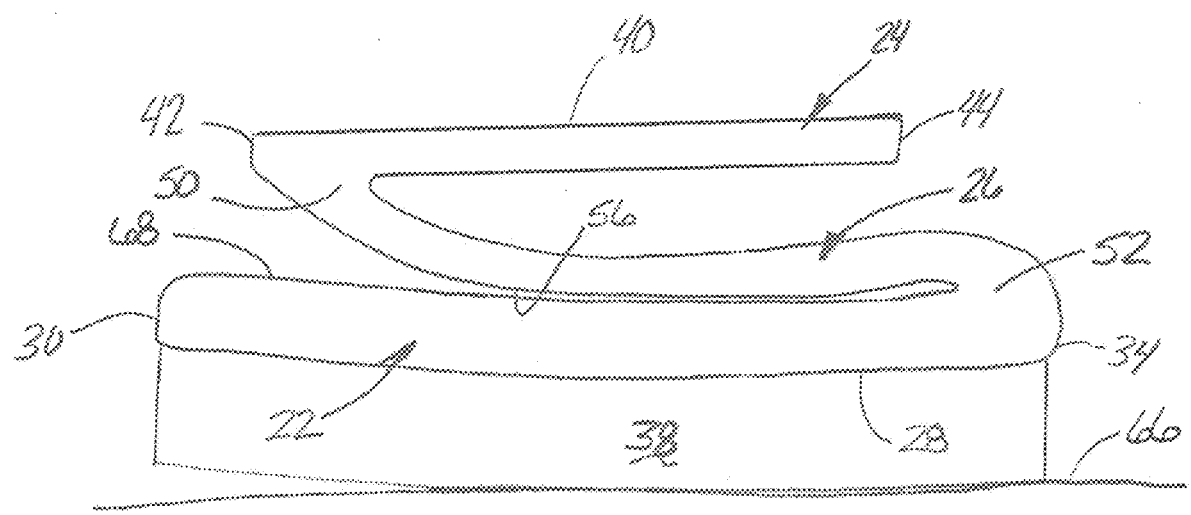
FIG. 4 is a sectional view of selected features of the example tire shown in FIG. 1 subjected to a load.

FIG. 4 shows a loaded condition, which is different than the default or as-molded condition of the tire 20 as shown in FIGS. 1-3. In the loaded condition, a section of the tire 20 engaging a ground surface 66 deflects or deforms in a resilient manner. In the loaded condition at least some of the outwardly facing surface 56 on the annular resilient spring portion 26 contacts or engages an inwardly facing surface 68 on the annular outer portion 22. The section of the annular resilient spring portion 26 that is under load deflects or bends from a default or as-molded position (shown in FIGS. 1-3) into a compressed position (as shown in FIG. 4).

The deflection or resilient deformation of the second junction 52 in this embodiment allows for the surface 56 to contact the surface 68 under load conditions in which additional tire material is desirable along the section of the tire 20 that engages the ground surface 66. Surface contact or engagement between the surfaces 56 and 68 establishes a multi-layered section of the tire 20 that enhances strong traction on the ground surface 66 by increasing the mass of the tire 20 that is involved in engaging the ground surface 66. The condition shown in FIG. 4 increases the "pound to the ground" of the tire 20. The multi-layered configuration when the surfaces 56 and 68 are in contact also contributes to extended tread life.

The configuration of the annular resilient spring portion 26 and the cantilevered way in which the annular outer portion 22 is supported allows the tread of the tire 20 to effectively map the ground surface and establishes a desirable contact patch. The engagement of the surfaces 56 and 68 also contributes to overcoming tire scrub. Additionally, the contact between the surfaces 56 and 68 resists or eliminates lateral movement of the annular outer portion 22 relative to a remainder of the tire 20 including when the tire 20 is turning or skidding. One of the features of the example tire 20 is that the entire tire 20 is a unitary structure having a one-piece body including all three portions 22-26.

In at least some circumstances, the multi-layered condition in which the surfaces 56 and 68 are engaged resists any rotational shear that may otherwise occur, for example if the annular outer portion 22 were to rotate any slower than the remainder of the tire 20.

The annular resilient spring portion 26 is configured to enhance ground engagement and perform like a jounce bumper to absorb impacts caused by uneven surfaces or blunt objects encountered by the tire 20 to increase driver or rider comfort.

Figure 5:
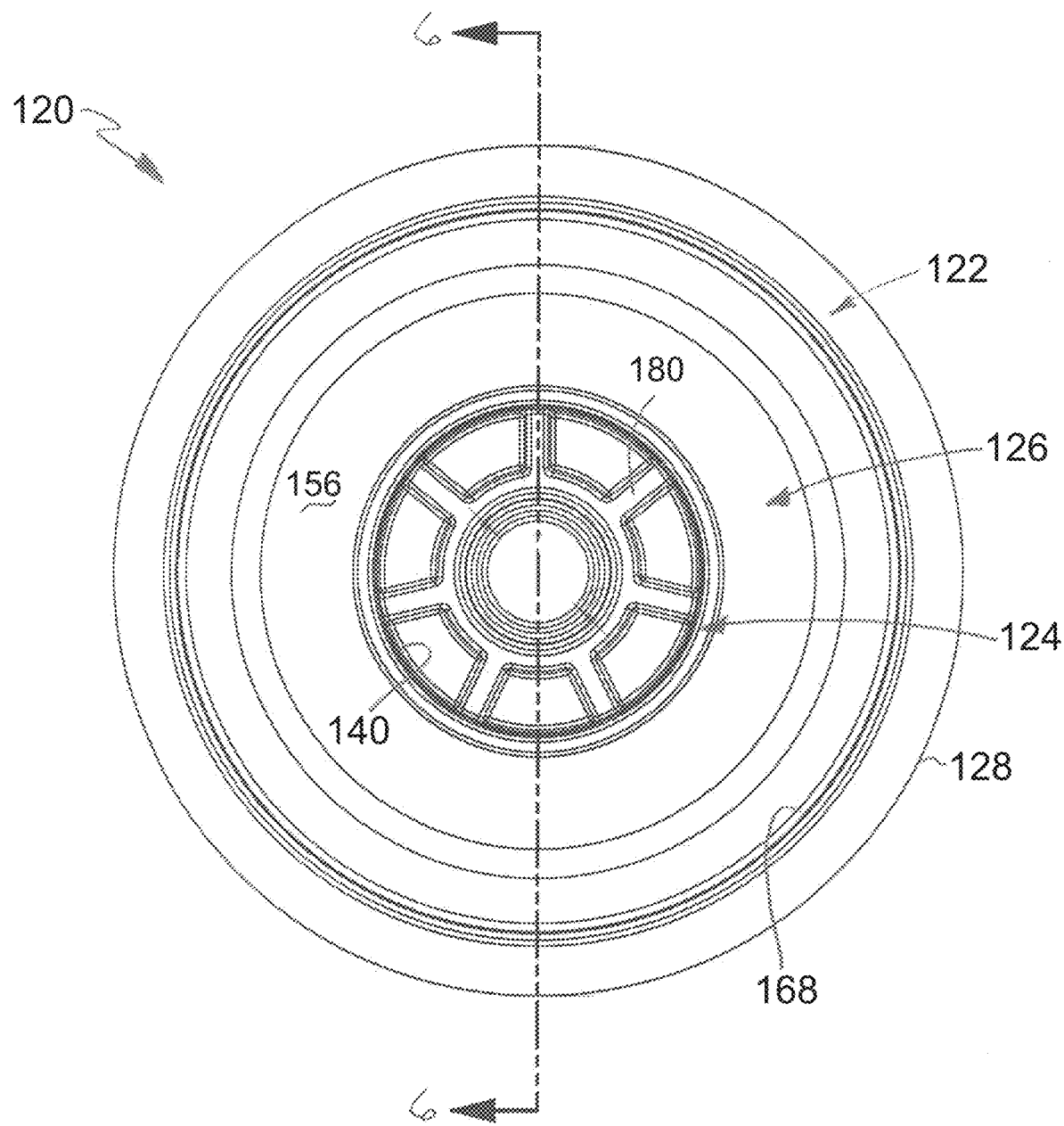
FIG. 5 is an elevational view of another illustrative example tire designed according to an embodiment of this invention.
Figure 6:
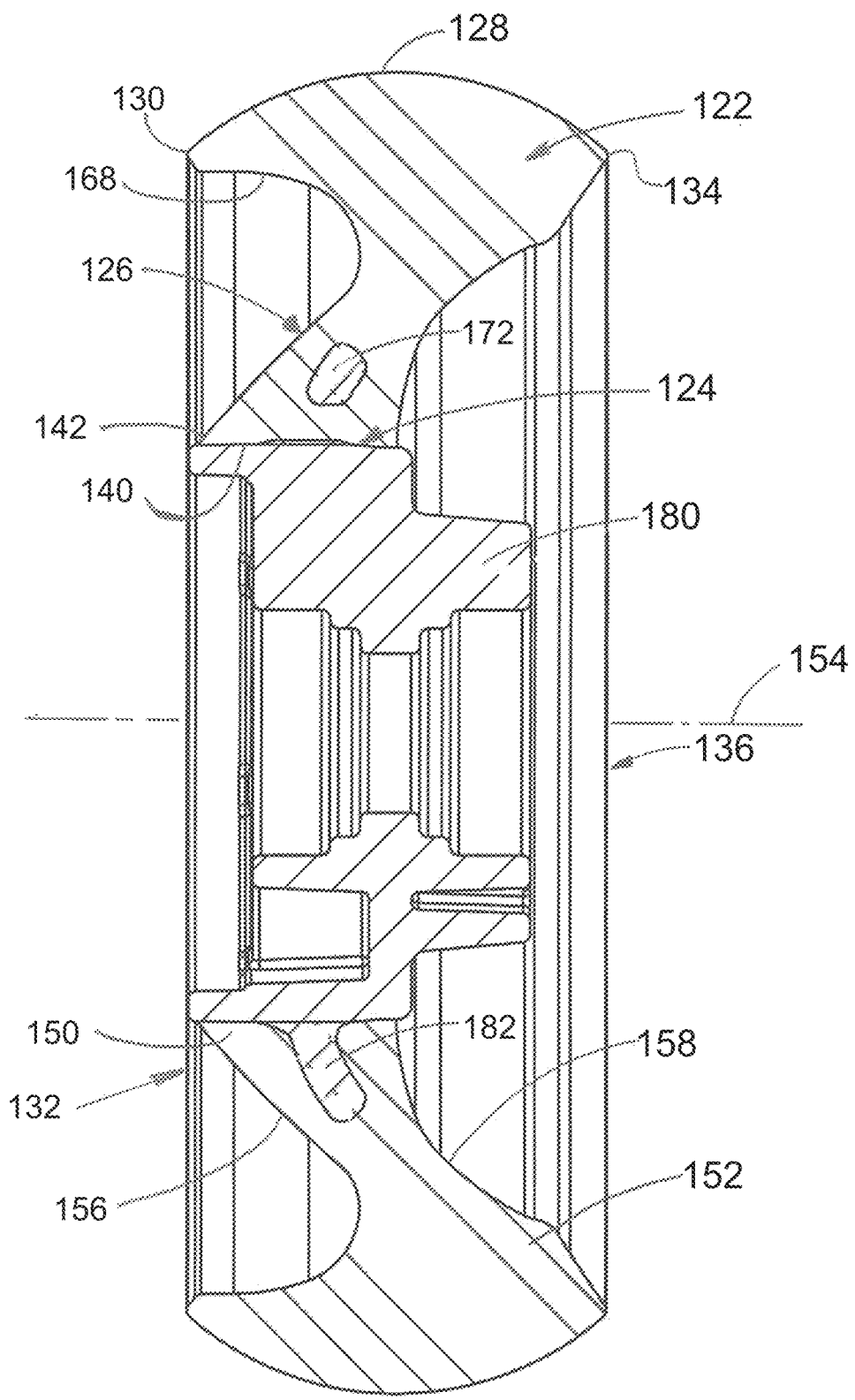
FIG. 6 is a cross-sectional view taken along the lines 6-6 in FIG. 5.
Figure 7:
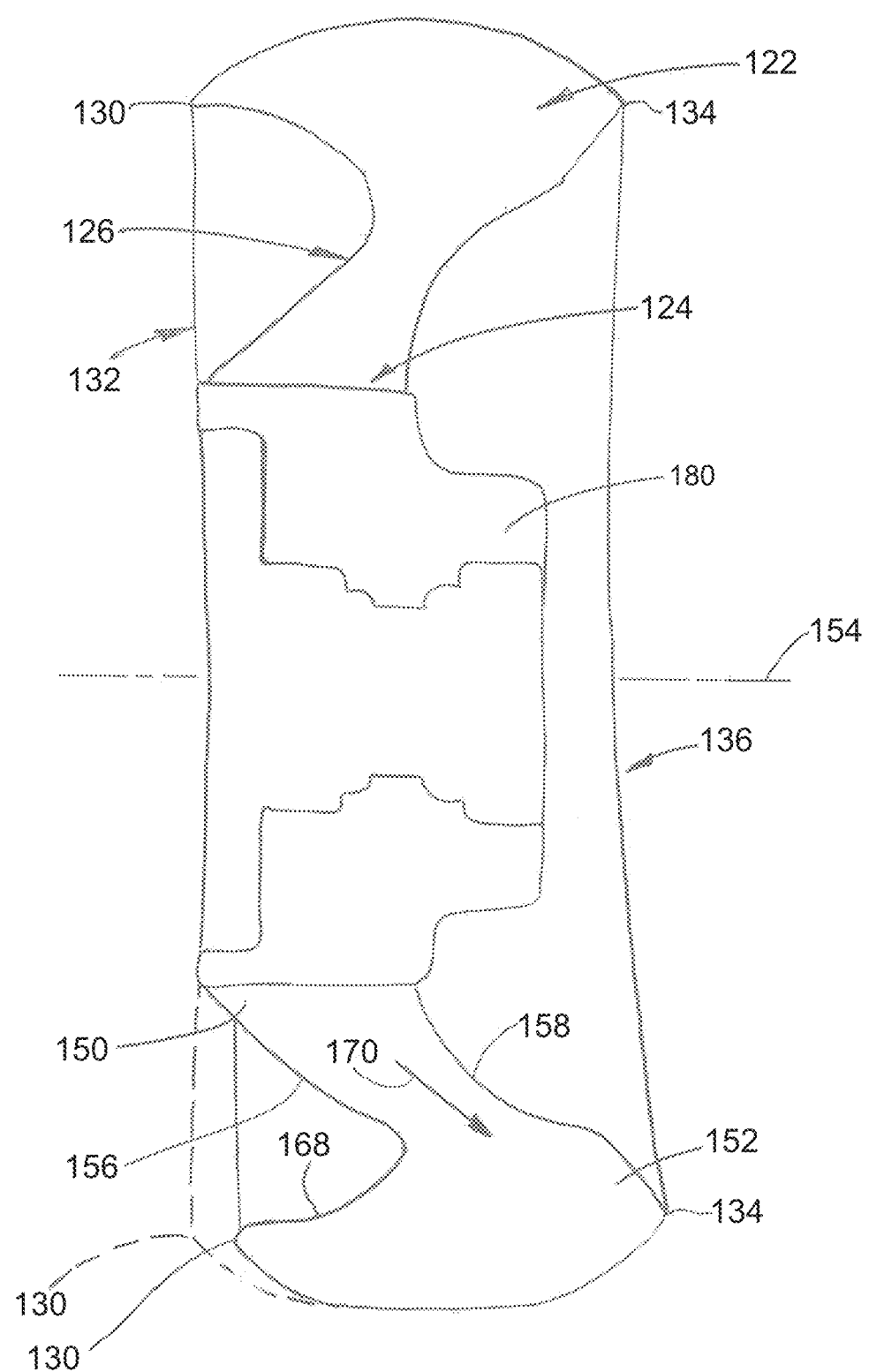
FIG. 7 is a sectional view of selected features of the example tire shown in FIG. 5 subjected to a load.

In this disclosure, like reference numerals designate like elements where appropriate and reference numerals with the addition of one-hundred or multiples thereof designate modified elements that, unless otherwise indicated, are understood to incorporate the same features and benefits of the corresponding elements. FIGS. 5-7 show another example embodiment of a tire 120. The annular outer portion 122, the annular inner portion 124 and the annular resilient spring portion 126 in this example are shaped differently than those in the embodiment discussed above. For example, the annular resilient spring portion 126 in FIGS. 5-7 has a varying thickness along its length. The annular resilient spring portion 126 is thickest near the junctions 150 and 152 and thinner along a midsection of its length. As can be appreciated from FIG. 6, a first thickness is provided between the first junction 150 and the midsection of the annular resilient spring portion 126. The midsection has a second, smaller thickness. A third thickness is provided between the midsection and the second junction 152. The third thickness is greater than the second thickness.

The differently configured annular resilient spring portion 126 behaves differently under load compared to the annular resilient spring portion 126 of the embodiment shown in FIGS. 1-4. Instead of deflecting to allow the surfaces 156 and 168 to contact each other, the annular resilient spring portion 126 is configured to deflect forces in a lateral direction toward one of the lateral sides of the tire 120. The frustoconical annular resilient spring portion 26 initiates sideways deflection of the energy associated with a load imposed on the tire 120. The thinner midsection of the annular resilient spring portion 126 contributes to further sideways movement. The annular outer portion 122 has a thinner cross-section or profile near the first edge 130 compared to that at the second edge 134. The thinner section near the edge 130 also allows for lateral movement of the annular outer portion 122.

For example, a force that is generally perpendicular to the axis of rotation 154 is deflected at an oblique angle toward the second edge 134 as schematically represented by the arrow 170 in FIG. 7. Deflecting forces in such a lateral direction causes relative lateral movement between the annular outer portion 122 and the annular inner portion 124. As shown in FIG. 7, under a vertical load (according to the drawing), the annular resilient spring portion 126 resiliently deforms and bends along the thinner midsection in a manner that urges the second edge 134 of the annular outer portion to move to the right (according to the drawing). In this embodiment, the primary flex point or location on the annular resilient spring portion 126 is on or along the midsection rather than at either junction 150, 152.

Under sufficient load, the annular outer portion 122 moves from the position shown in broken lines, which corresponds to a default or as-molded position relative to the annular inner portion 124 while under a load that is sufficient to cause the amount of deflection shown in FIG. 7.

The sideways or lateral deflection of the forces associated with the load on the tire 120 provides low rolling resistance and attenuates vibration, which enhances ride performance.

FIGS. 5 and 6 show one example way in which the annular inner portion 124 is configured to be secured to a wheel hub 180. In this embodiment, the tire 120 is molded and the annular inner portion 124 is over-molded onto the wheel hub 180. Securing projections 182 are situated within the material of the body of the tire as a result of the over-molding process used in this embodiment. Other embodiments include alternative ways of securing the annular inner portion 124 to a wheel hub. For example, a covalent bond may be established between the material of the tire 120 and the material of the wheel hub 180 or an adhesive may be applied at the interface.

Both of the embodiments discussed above have a one-piece tire body that includes all of the portions 122, 124 and 126 and the junctions 150 and 152. The entire body of the tire 120 has the same material composition. The body of the tire 120 is continuous such that transitions between the annular portions and the junctions are uninterrupted and without any connections between separate pieces. In the illustrated example embodiments, the material composition is homogenous and consistent throughout the entire body of the tire 120. The one-piece construction with a homogenous material composition is different than previously proposed airless tires.

Using a single material composition and a one-piece body results in a cost-effective tire 20 that performs well. The illustrated example embodiments include a material composition that comprises a low modulus elastomer. Some embodiments have a material composition that includes rubber, such as rubber mixed with a thermoplastic. The modulus of elasticity of the material in such embodiments is in a range from 3 MPa to 250 MPa.

An elastomer material that has a low modulus of elasticity provides desirable performance characteristics. For example, the disclosed example tires 120 include good abrasion resistance, good traction even in wet conditions, low rolling resistance, and vibration attenuation. The low modulus elastomer used in example embodiments also absorbs noise and impact forces, which reduces intrusivity and enhances the comfort or experience of a driver or rider traveling over an uneven surface.

The tire 20, 120 of either of the discussed embodiments can be manufactured using a single process, such as injection molding, compression molding, casting or three-dimensional printing. Reducing manufacturing steps and avoiding any need to assemble separate pieces reduces cost associated with making tires. The material selection will depend on the particular manufacturing process used and those skilled in the art who have the benefit of this description will be able to select the process and material that will best suit their particular needs.

The various features of the embodiments discussed above may be modified or combined other than as shown to realize other embodiments. The disclosed embodiments show how a tire designed according to an embodiment of this invention can be configured to perform under a variety of conditions for various situations. The embodiment shown in FIGS. 1-4 can be considered a flat type tire that is particularly useful for movement over deformable ground. Tires having features of that embodiment are useful in situations in which the tire travels over natural surfaces, such as a forest floor, a field, snow, or sand. The embodiment shown in FIGS. 5-7 can be considered a low-resistance and shock-attenuation type tire that is particularly useful for movement over nondeformable or hard surfaces, such as concrete pavement. Such tires are useful, for example, on wheelchairs, bicycles and automobiles because they enhance ride stability and comfort.

The embodiments discussed above and others have various features in common. For example, such tires are relatively inexpensive, easy to manufacture, and do not require any complex material reinforcement or construction. At the same time, such tires provide good traction and ride comfort. Such tires can be configured to fit onto standard wheel hubs and are useful in a wide variety of situations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A tire comprising:
   a one-piece body having an elastomer material composition, the one-piece body including:
      an annular outer portion including an outwardly facing surface that defines an outer circumference of the tire, the annular outer portion defining a width of the tire between a first edge on a first lateral side of the tire and second edge on a second lateral side of the tire, the annular outer portion defining a cavity;
      an annular inner portion that defines an inner circumference of the tire, the annular inner portion having a first edge on the first lateral side of the tire and a second edge on the second lateral side of the tire; and
      an annular resilient spring portion extending between a first junction near the first edge of the annular inner portion and a second junction near the second edge of the annular outer portion;
   wherein the elastomer material composition of the annular outer portion, the annular inner portion, and the annular resilient spring portion is homogeneous and consistent throughout an entirety of the one-piece body;
   wherein the annular resilient spring portion is frustoconical;
   wherein when the tire is in an uncompressed state, at least the second edge of the annular inner portion is disposed within the cavity;
   wherein as the annular resilient spring portion extends towards the second edge of the annular outer portion, the annular resilient spring portion extends beyond an axial position of the second edge of the annular inner portion; and
   wherein the first edge of the annular inner portion is closer to an axial position of the first edge of the annular outer portion than to an axial position of the second edge of the annular outer portion.

2. The tire of claim 1, wherein an entirety of the one-piece body is formed during a single manufacturing process that establishes the annular outer portion, the annular inner portion, and the annular resilient spring portion.

3. The tire of claim 2, wherein the single manufacturing process comprises injection molding, compression molding, casting or three-dimensional printing.

4. The tire of claim 1, wherein the elastomer material comprises rubber.

5. The tire of claim 1, wherein the first junction and the second junction each include a rounded bend.

6. The tire of claim 1, wherein the annular resilient spring portion has a curved profile between the first junction and the second junction.

7. The tire of claim 1, wherein the outwardly facing surface of the annular outer portion defines a ground-engaging tread of the tire.

8. The tire of claim 1, wherein
   the annular resilient spring portion has a default position in which the annular resilient spring portion is spaced from an inwardly facing surface of the annular outer portion, and
   at least a section of the annular resilient spring portion flexes under load into a compressed position where the section of the annular resilient spring portion contacts the inwardly facing surface on the annular outer portion.

9. The tire of claim 8, wherein the section of the annular resilient spring portion engages the inwardly facing surface on the annular outer portion in a manner that resists relative lateral movement between the annular resilient spring portion and the annular outer portion.

10. The tire of claim 8, wherein
   the first junction flexes a first amount in response to the load,
   the second junction flexes a second amount in response to the load, and
   the second amount is greater than the first amount.

11. The tire of claim 8, comprising a stiffening reinforcement that connects the annular resilient spring portion to the annular inner portion.

12. The tire of claim 11, wherein the stiffening reinforcement comprises a plurality of ribs.

13. The tire of claim 8, wherein the annular resilient spring portion has
   a single, consistent thickness between the first junction and the second junction, or
   a varying thickness between the first junction and the second junction.

14. The tire of claim 1, wherein
   the annular resilient spring portion flexes from a default position into a compressed position in response to a force in a direction perpendicular to an axis of rotation of the tire, and the annular resilient spring portion deflects at least some of the force in a direction toward one of the lateral sides of the tire.

15. The tire of claim 14, wherein the annular outer portion moves relative to the annular inner portion in a lateral direction in response to the at least some of the force that is deflected.

16. The tire of claim 14, wherein the annular resilient spring portion is configured to establish lines of thrust directed toward the second lateral side.

17. The tire of claim 14, wherein
the annular resilient spring portion has a first thickness between the first junction and a midsection of the annular resilient spring portion,
the midsection of the annular resilient spring portion has a second thickness,
the first thickness is greater than the second thickness,
the annular resilient spring portion has a third thickness between the midsection and the second junction, and
the third thickness is greater than the second thickness.

18. The tire of claim 17, wherein
the first thickness progressively increases along a direction from the midsection toward the first junction, and
the second thickness progressively increases along a direction from the midsection toward the second junction.

19. The tire of claim 17, wherein the annular outer portion has a thinner cross-section or profile near the first edge compared to that at the second edge.

20. The tire of claim 1, wherein when the tire is in an uncompressed state, both the first edge and the second edge of the annular inner portion are disposed within the cavity.

21. The tire of claim 1, wherein the annular outer portion includes a plurality of additional cavities spaced evenly around a circumference of the annular outer portion.

22. A method of making a tire, the method comprising using a single manufacturing process to establish a one-piece body having an elastomer material composition that is homogeneous and consistent throughout an entirety of the one-piece body, wherein:
the one-piece body has an annular outer portion, an annular inner portion, and an annular resilient spring portion;
the annular outer portion includes an outwardly facing surface that defines an outer circumference of the tire;
the annular outer portion has a first edge on a first lateral side of the tire and second edge on a second lateral side of the tire;
the annular inner portion defines an inner circumference of the tire;
the annular inner portion has a first edge on the first lateral side of the tire and a second edge on the second lateral side of the tire; and
the annular resilient spring portion is frustoconical and extends from a first junction near the first edge of the annular inner portion to a second junction near the second edge of the annular outer portion;
when the tire is in an uncompressed state, at least the second edge of the annular inner portion is disposed within a cavity defined by the annular outer portion; and
the first edge of the annular inner portion is closer to an axial position of the first edge of the annular outer portion than to an axial position of the second edge of the annular outer portion.

* * * * *